United States Patent [19]
Jones, Jr.

[11] 3,777,940
[45] Dec. 11, 1973

[54] BOTTOM FLUID DISTRIBUTOR FOR SHAFT VESSELS

[75] Inventor: John B. Jones, Jr., Denver, Colo.

[73] Assignee: Paraho Corporation, Denver, Colo.

[22] Filed: Nov. 10, 1971

[21] Appl. No.: 197,359

[52] U.S. Cl. .............................................. 222/193
[51] Int. Cl. ............................................... B67d 5/54
[58] Field of Search ................... 222/544, 547, 564, 222/536, 151, 149, 181, 460, 461, 537, DIG. 1, 193; 214/17 D, 18 R; 221/241, 242; 249/209; 263/29, 30

[56] References Cited
UNITED STATES PATENTS

| | | | |
|---|---|---|---|
| 3,401,922 | 9/1968 | Jones | 214/18 R |
| 982,244 | 1/1911 | Case | 263/29 X |
| 2,451,024 | 10/1948 | Ellerbeck | 263/29 |
| 3,373,982 | 3/1968 | Jones | 214/18 R X |

Primary Examiner—Samuel F. Coleman
Assistant Examiner—Norman L. Stack, Jr.
Attorney—Richard D. Law

[57] ABSTRACT

A vertical shaft vessel, having a solids discharge mechanism, which includes laterally directed deflection plates arranged to deflect solids to the discharge openings of the discharge mechanism, is provided with a lower annular chamber in conjunction with the discharge mechanism, which is further provided with superimposed cover plates mounted above the deflection plates defining therewith predetermined sized slots for introducing predetermined quantities of fluid through the slots into predetermined areas across the lateral extent of the vessel to provide a uniform flow of treating fluid across the lateral extent of the shaft vessel from the discharge mechanism to a first treatment zone thereabove.

8 Claims, 6 Drawing Figures

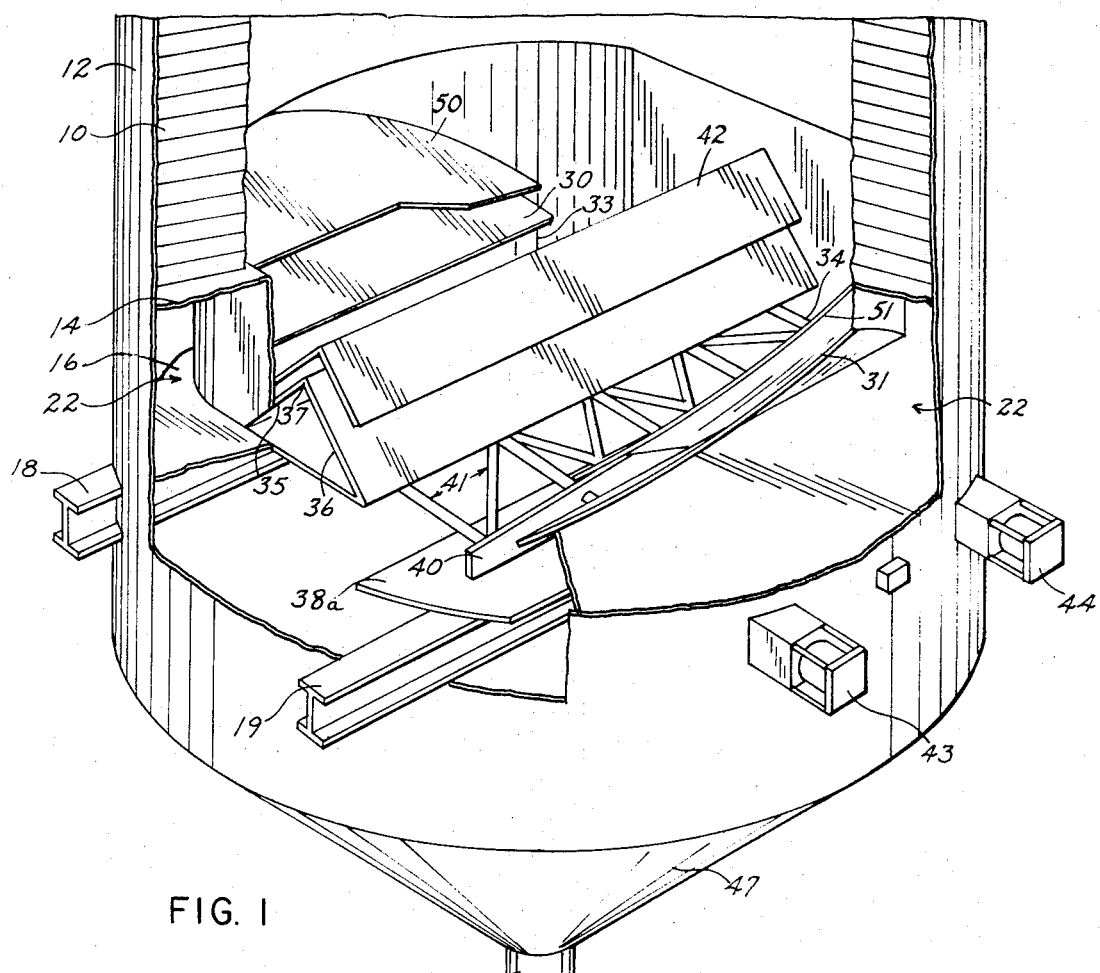
FIG. 1
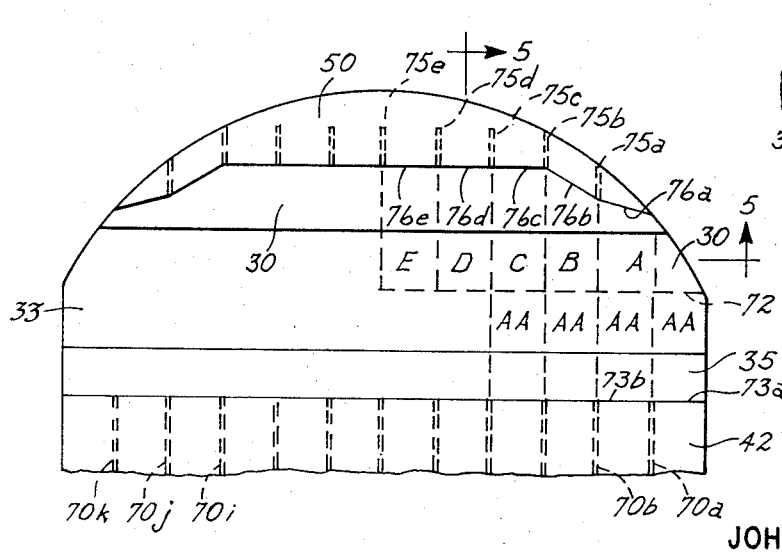
FIG. 2
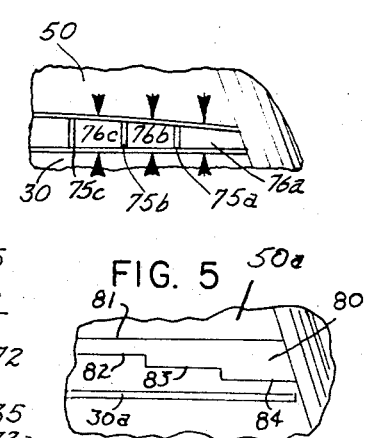
FIG. 5
FIG. 6
INVENTOR
JOHN BURNETT JONES, JR.
BY
Richard H. Law
ATTORNEY

INVENTOR
JOHN BURNETT JONES, JR.

BOTTOM FLUID DISTRIBUTOR FOR SHAFT VESSELS

One type of process equipment commonly found in diverse types of industry is a vertical vessel having a gravity flow of particulate solids from an upper feed to a lower discharge. Such vessels usually have a longer vertical extent than a cross-sectional dimension. Commonly such vessels are called shaft or vertical kilns, shaft furnaces, shaft generators, and the like, depending on the treatment and the particular type of material being treated. Such vessels have been found useful for burning or calcining treatments, such as the calcining of various types of materials to produce lime, coking coal, burning magnesite and/or dolomite, retorting oil shale, etc. The unit process equipment includes the vertical vessel, means for uniformly feeding granular or pulverulent material across the lateral extent of the vessel, a lower discharge means for providing a uniform discharge of the solid material, and some means for introducing treating fluid into the solids so that the solid material may be treated. One of the major problems encountered in the type of vessel is the requirement for a uniform flow of solids across the lateral extent of the vessel from top to bottom so as to provide uniform treatment of all the solid particles passing through the shaft vessel. Another problem is the lateral distribution of the treating fluid, again to provide uniform treatment of the particles passing through the vessel. Because of the problems encountered in the flow of material through the vessel the majority of the known installations are rectangular cross-section, vertical kilns of relatively small cross-sectional dimensions. Some circular shaft vessels have been tried, but due to their limited diameters and lack of control of uniform movement of the particulate material and the fluid material through the vessel they have not been received with much favor in the industry. The small rectangular vessels have found a small niche in a few industries, for example the lime industry, as it is relatively easy to induce an excess flow of air and fuel for burning the particulate lime stone, or other lime producing material. However, some substantial amount of overburning readily results in the excesses. A major problem occurs with all such equipment on attempting to increase the cross-sectional dimensions since the movement of the solid material and the fluids through the vessel becomes quite critical. From a structural standpoint a circular cross-sectional vessel is more economical to build and support in operative position than a rectangular vessel, however, the configuration of the circular vessels induces additional problems of flow of the various materials.

In a number of process operations using vertical vessels, crushed rock of a variety of sizes is fed into the top of the vessel and treated with hot gases of combustion to effect a change in the rock, for example calcining limestone to lime. In many such processes, the calcining temperaures are produced by combustion of fuel in the bed of rock. As the particulate material moves through the vessel, starting from the feed into the vessel, a certain amount of segregation occurs, thus preventing a fully uniform distribution of particles laterally of the kiln. When segregation does occur, larger sizes may predominate in a portion of the vessel while the smaller sizes predominate in other portions. Such segregation results in channeling and producing an uneven flow of fluids throughout the solids in the vessel. The channeling may not provide sufficient time to completely treat some of the particles, particularly the larger particles through which fluids flow more easily than the smaller particles. Also the restriction to flow caused by segregated smaller particles, overburn of these smaller particles is common.

The problem of producing equal contact time for all the particles in the vessel has been perplexing and actually inhibited the growth of vertical kilns. As pointed out above small diameter kilns have been used, however, the optimum economy does occur with the larger diameter circular kilns. Prior art workers have failed to produce a unit which has a uniform horizontal distribution of the solids, and a uniform treatment by the fluid throughout the vertical extent of the bed in the vessel. Treatment fluids have been introduced at various elevations in the vessel in an attempt to provide treatment for all particles, and in a few instances treatment fluids, also, have been passed up through the solids discharge mechanism or introduced at about above the level of the discharge mechanism.

It is, therefore, an object of the invention to provide apparatus arranged to inject into the bottom of a bed of particulate matter in a vertical vessel a substantially uniform quantity of fluid per unit of cross-sectional area at a point adjacent to the solids discharge mechanism so as to provide a uniform flow of fluid from the discharge mechanism to the treatment zone thereabove.

Another object of the invention is to provide a uniform introduction of fluids into a bed of solid material in a vertical vessel utilizing a portion of the discharge mechanism as the fluid introduction system, and, thereby, cool the grate mechanism.

A further object of the invention is to provide a uniform flow of a fluid in a bed of granular material in a vertical kiln, laterally of the vessel from a discharge outlet of the kiln to a first combustion zone above the discharge.

An additional object of the invention is to provide a control system for the uniform and simultaneous introduction and distribution of gaseous material into vertical vessels containing a moving bed of broken or particulate solids and/or fluids.

These and other objects and advantages of the invention may be readily ascertained by referring to the following description and appended illustrations in which:

FIG. 1 is a perspective view of the lower discharge end of a vertical vessel, partly broken away, showing a discharge mechanism for the vessel;

FIG. 2 is a partial top plan, generally schematic, view of a portion of the discharge mechanism of the device of FIG. 1 including means for introducing gaseous material uniformly across the lateral extent of the vessel;

FIG. 5 is an oblique elevational view of a portion of the diverter plate system, taken parallel to the diverter plates of a portion of the discharge mechanism, along section line 5—5 of FIG. 2; and FIG. 6 is a modified form of the fluid opening.

In general, the device of the invention provides in a vertical vessel, an annular bustle chamber immediately above the discharge grate of a vertical vessel in the area of sloped diverter plates which divert solid material to the discharge outlets. Fluid distribution caps mounted over the diverter plates provide predetermined sizes of slots through which fluids are injected into the bed of moving particulate material so as to introduce a predetermined quantity of the fluid at a particular point depending upon a cross-sectional area of the vessel serviced by the particular slot.

Figure 3:
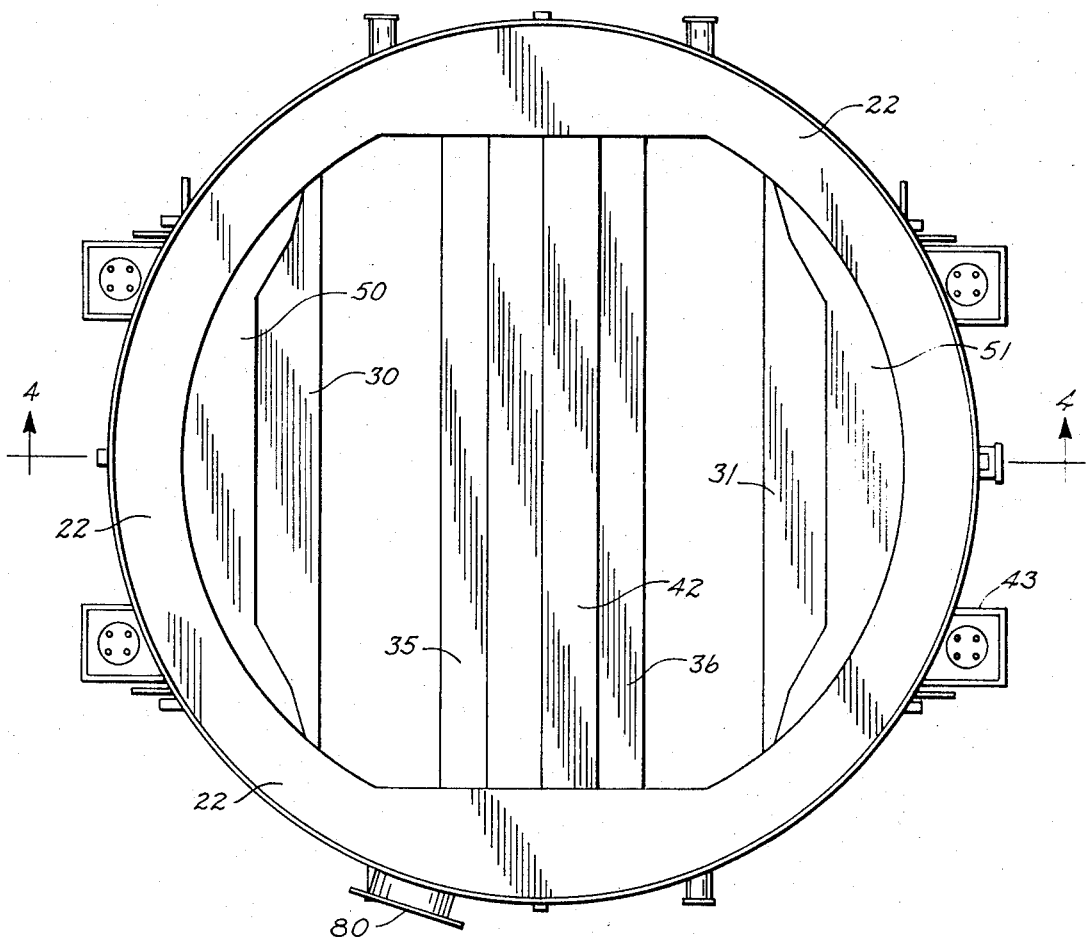
FIG. 3 is a top plan view of the discharge mechanism of the vertical vessel of FIG. 1.
Figure 4:
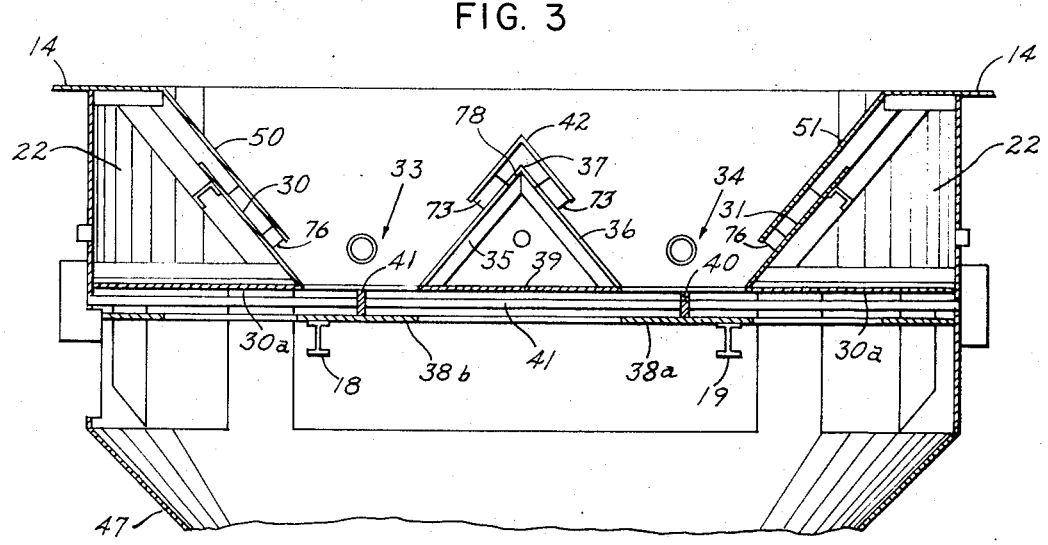
FIG. 4 is a side cross-sectional view of the discharge mechanism of FIG. 1 taken along section line 4—4 of FIG. 3.

The vertical vessel or kiln includes a circular wall 10 of refractory material, which extends upwardly from the lower section shown in FIG. 1, and usually the exterior of the refractory material is clad with a skin 12 of steel or the like to provide support for the refractory and additional mechanism necessary for the operation of the kiln. The circular wall 10 is supported on an annular plate 14, which supports the refractory wall, and a lower annular wall 16, with supporting beams 18 and 19 to support the structure of the kiln. Ground suported structure (not shown) of course, is secured to the beams 18 and 19 for supporting the unit in vertical position above the ground. Formed between the plates 14 and 16 is a bustle chamber 22, which is an annular chamber extending around the vessel. The discharge mechanism of the kiln includes opposed side deflecter or diverter plates 30 and 31 which extend from the wall in opposed positions downwardly to generally rectangular openings 33 and 34, FIG. 4. The openings 33 and 34 are separated by a central inverted V-shaped diverter plate including angled plates 35 and 36 which are joined at apex 37. A retarder plate is placed under each of the openings 33 and 34, and a retarder plate 38a, illustrated in FIG. 4, is positioned under the opening 34. A retarder plate 38b is placed below the opening 33. These retarder plates prevent the direct gravity flow of material in the kiln through an outlet and must extend under the edges of the diverter plates. Scraper bars are mounted on the retarder plates and these are arranged to reciprocate across the plate to remove a predetermined amount of material from the plate, and thereby discharge the same from the vertical kiln. Scraper bar 40 is connected by means of frame structure 41 (FIG. 1) to scraper bar 41, and the movement of the bars across the plate is produced by fluid cylinders 43 and 44. The cylinders may be hydraulic, pneumatic or otherwise to provide a controlled reciprocating motion of the scraper or pusher bars for discharging material from the retarder plates. The general structure of the grate mechanism is adequately described in my U.S. Pat. No. 3,401,922 issued Sept. 17, 1968. Material from the retarder plates flows into a discharge cone 47, and from there to an outlet 48 at the bottom thereof.

Mounted on the diverter plates are cap plates which are spaced from the diverter plates and arranged to provide a means for introducing fluids, and particularly gas, into the bed of particulate solids. Cap plate 50 (FIG. 4) is mounted on diverter plate 30 and cap plate 51 is mounted on diverter plate 31. In the middle of the kiln, a V-shaped cap plate 42, is mounted above the apex 37 of the joined middle plates 35 and 36. The caps are supported on the diverter plates by risers which are of a variable and predetermined height, providing an area for the slot desired for that particular location. In the middle, the cap 42 is supported from and secured to the diverter plate 35 by means of a series of risers 70a, 70b, etc., across to the risers 70i, 70j and 70k, FIG. 2. Assuming the dashed line 72 (FIG. 2) is the dividing line of the space 33, and assuming that the fluid issuing from the slot between the plate 35 and the cap 42 flows into the complete area and to midpoint 72, the area serviced by the slots may be represented by the area shown in the dashed lines, and the areas marked A—A represent areas of equal dimensions serviced by the middle fluid injector. Thus, the area serviced by the slot 73a between the plate 35 and the cap 42 and bounded by the riser 70a and the wall is an area A—A. In a similar manner, slot 73b provides fluid for the area which is equivalent size as the first area and, therefore, the slot 73b is the same height as the slot 73a. Since the middle diverter services a rectangular area, the slots between the plate 35 and the cap 42 are all the same height. For a 12-foot kiln, the slots have been found adequate for the purpose at a height of one-half inch. Thus, the risers holding the cap plate are cut one-half inch high, and all the slots on both sides of the middle diverter are one-half inch in height.

On the side diverters, however, the arc of the interior diameter of the kiln produces a changing area across the chord of the kiln, and the slot under the cap plate must vary to correspond with the change in the area. For example as shown in FIG. 2, area A is smaller than area B which in turn is smaller than area C, etc., across the diverter plate 30. This is considering the area from the dividing line 72 to the wall of the kiln. The riser 75a must be of a different height than the riser 75b to provide a slot 76a which is narrower than the slot 76b. The riser 75c must be higher than the riser 76c so that the slot 76c is vertically wider than the slot 76b. Thus, the slots in the cap plate 50 increase in height from the side to about the middle and then narrows again to the opposite side in a mirror image arrangement. In a 12-foot kiln with a two opening grate as illustrated, area A is calculated to be 145.15 square inches, area B 206.77 square inches, area C is 247.96 square inches, and the maximum area is calculated to be the E area which is 285.97 inches. To provide for the change in area, slot 76a is made 9/32 inches high, slot 76b is 23/64 inches, slot 76c 31/64 inches high, slot 76d is 35/64 inches high and the highest slot is slot 76e, whch is 9/16 inches high. The slots continue across the cap plate 50. Furthermore, slots under the cap plate 51 on the other side of the kiln are of equivalent dimensions.

The bustle chamber 22 is filled with a fluid mixture from an inlet opening 80, or more if desired, with the pressure provided in the bustle chamber substantially uniform around its annular extent. The fluid from the bustle chamber enters the middle distributor under the plates 35 and 36 which is open at both ends into the bustle chamber, and a plate 39 on the bottom closes the chamber under the diverter plates 35 and 36. An annular plate 30a closes the volume under each of the diverter plates 30 and 31, and openings in the bustle wall provide access between the bustle chamber and the chamber under the side opposed diverter plates. The fluid under pressure from the bustle chamber is then forced out through the slots under the cap plates on the diverter plats under substantially equal pressure so that the fluid passes upwardly through the particulate material and uniformly distributed across the lateral extent of the kiln. The slots in the middle diverter are fed from opening 78 in the top of the plates 35 and 36 which feed the small chamber under the cap plate 42 leading to the slots therein.

The present invention provides means for effectively introducing fluids in a uniform distribution throughout the cross-sectional extent of the kiln or vertical vessel. As the diameter of the vertical vessel is made larger the number of discharge openings for the grate must increase, therefore the number of the inverted V-shaped diverter plates must, likewise, increase. The volume of fluid introduced into the vessel through its lower distributor arrangement is controlled by controlling the pressure at which the fluid is injected into the bustle chamber and, aso, by controlling the pressure of the fluid injected into the vessel in stages above the discharge outlet. A higher pressure in an upper zone tends to impede the upward flow of fluid from the lower zone, which provides means of controlling the flow of fluids in the vessel. Regardless of the pressure, however, the lateral distribution of the fluids in the lower part of the vessel is controlled by the slots under the cap plates. The predetermined sizing of the slots provides means for uniformly delivering fluids into the circular cross-sectional area of the kiln.

As shown in the drawings, the variable opening is formed by using the variable height spacers under the cap plate. However, the opening may be easily made by forming an edge on the cap plate and bending it downwardly at 90° to the plate. The configuration of the edge determines the opening spacing between the cap and the base plate. The application is shown with a linear grate, however, it is applicable to other grate configurations, such as shown in U. S. Pat. No. 3,373,982, issued Mar. 19, 1968.

Specifically, the variable spacing may be obtained, by bending the edge of the cap plate, which has a stepped edge, at an angle to the plate. As illustrated in FIG. 6, a plate 50a has its edge 80 bent at an angle along bend lines 81 the steps 82, 83, and 84. The plate 30 is planar thereby permitting the formation of variable width openings under the various steps. The height of each opening is determined by the area to be serviced by the particular section of the opening, as per the discussion of FIG. 2. This arrangement, in many instances, is easier and faster to manufacture.

I claim:

1. Bottom fluid distributor for circular shaft vessels, such as kilns or the like, having grate means for supporting a column of particulate material in said shaft vessel and openings within said grate means arranged for discharging the material from said vessel, said distributor comprising:
   a. a plurality of deflector plates mounted in said shaft vessel adjacent to and above said grate means for directing particulate material to said openings within the grate means,
   b. annular fluid bustle chamber means arranged around the perimeter of said shaft vessel and encircling said deflector plates, said chamber being fully enclosed to direct passage of fluid around said shaft vessel,
   c. at least one cap plate mounted in said shaft vessel juxtaposed above at least one of said deflector plates providing an open passageway therebetween;
   d. means for providing communication between said bustle chamber and the passageway between said at least one cap and deflector plate, and
   e. means for providing a predetermined elongated opening between the outer edge of said at least one cap plate and its adjacent deflector plate and dividing said elongated opening into length segments along said edge so as to define an outlet slot for each of said segments whereby the volume of fluid exhausting into the vessel along the cap plate edge slots provide a uniform flow of fluid across the lateral extent of the shaft vessel.

2. Bottom fluid distributor according to claim 1 wherein said opening and dividing means is a plurality of risers having predetermined heights arranged between the deflector plate and the cap plate and normal to the edge of the cap plate.

3. Bottom fluid distributor according to claim 1 wherein the slotted segments of the edge of said at least one cap plate are formed by a plate member attached to the edge of said cap plate and arranged at an angle to the plane of said at least one cap plate toward the adjacent deflector plate, each of said slotted segments formed by said angled edge member being of a height to provide a predetermined open area for each slotted segment.

4. Bottom fluid distributor according to claim 1 wherein the height of the opening of each slotted segment along the edge of said at least one cap plate is based on the corresponding cross sectional area of the vessel so as to provide the uniform fluid flow in said vessel throughout the cross sectional extent of the vessel at said grate means.

5. Bottom fluid distributor according to claim 1 wherein the space under said deflector plates and said at least one plate mounted in superposition thereto is in communication at opposed ends with said bustle chamber.

6. Bottom fluid distributor according to claim 1 wherein opposed side deflector plates are mounted directing material centerwise of said vessel, and each said at least one cap plate mounted in superposition thereabove is at the same angle as said deflector plates.

7. Bottom fluid distributor according to claim 1 wherein said deflector plates are sloped.

8. Bottom fluid distributor according to claim 7, wherein two of said deflector plates are arranged in intersecting position transverse to said shaft vessel, each sloped in downward, opposite directions and joined at their intersection to form an apex, and a cap plate mounted above each deflector plate in parallel, spaced relation and joined at their intersection to form an apex above the apex of said deflector plates to form a downwardly directed passageway in each direction.

* * * * *